United States Patent [19]

Reed

[11] 4,345,488

[45] Aug. 24, 1982

[54] HYDROMECHANICAL STEERING TRANSMISSION

[75] Inventor: Bradley O. Reed, Pittsfield, Mass.

[73] Assignee: General Electric Company, Schenectady, N.Y.

[21] Appl. No.: 142,033

[22] Filed: Apr. 21, 1980

[51] Int. Cl.³ ............... F16H 47/04; F16H 37/06; F16H 1/44

[52] U.S. Cl. ............................ 74/682; 74/687; 74/710.5

[58] Field of Search ........... 74/687, 710.5, 720, 74/720.5, 677, 682

[56] References Cited

U.S. PATENT DOCUMENTS

| | | | |
|---|---|---|---|
| 2,377,354 | 6/1945 | Merritt | 74/682 X |
| 3,075,408 | 1/1963 | Chapman et al. | 74/677 |
| 3,383,952 | 5/1968 | Christenson | 74/720.5 |
| 3,398,605 | 8/1968 | Ainsworth et al. | 74/687 X |
| 3,426,621 | 2/1969 | Mooney, Jr. et al. | 74/720.5 |
| 3,433,095 | 3/1969 | Tuck | 74/687 |
| 3,492,891 | 2/1970 | Livezey | 74/687 X |
| 3,496,803 | 2/1970 | Whelahan | 74/687 X |
| 3,503,278 | 3/1970 | Livezey | 74/720.5 X |
| 3,529,492 | 9/1970 | Tuck | 74/720.5 |
| 3,532,006 | 10/1970 | Polak et al. | 74/720.5 |
| 3,538,790 | 11/1970 | Polak | 74/720.5 |
| 3,575,066 | 4/1971 | Livezey et al. | 74/720.5 |
| 3,583,256 | 6/1971 | Livezey | 74/720.5 |
| 3,590,658 | 7/1971 | Tuck | 74/687 |
| 3,596,535 | 8/1971 | Polak | 74/687 |
| 3,714,845 | 2/1973 | Mooney, Jr. | 74/687 |
| 3,815,698 | 6/1974 | Reed | 74/720.5 |
| 3,861,240 | 1/1975 | Nolan et al. | 74/687 |
| 4,164,155 | 8/1979 | Reed et al. | 74/687 |
| 4,164,156 | 8/1979 | Reed | 74/687 |
| 4,258,585 | 3/1981 | Orshansky, Jr. et al. | 74/687 |

FOREIGN PATENT DOCUMENTS 4427 10/1979 European Pat. Off. .

*Primary Examiner*—Leslie Braun
*Attorney, Agent, or Firm*—Francis K. Richwine

[57] ABSTRACT

An infinitely variable split output synchronously shifting hydromechanical steering transmisson having integral steering and at least three forward ranges having progressively lower torque and higher speed propulsion ratios in successively higher ranges while maintaining positive steer with a constant steering torque ratio in all ranges.

15 Claims, 9 Drawing Figures

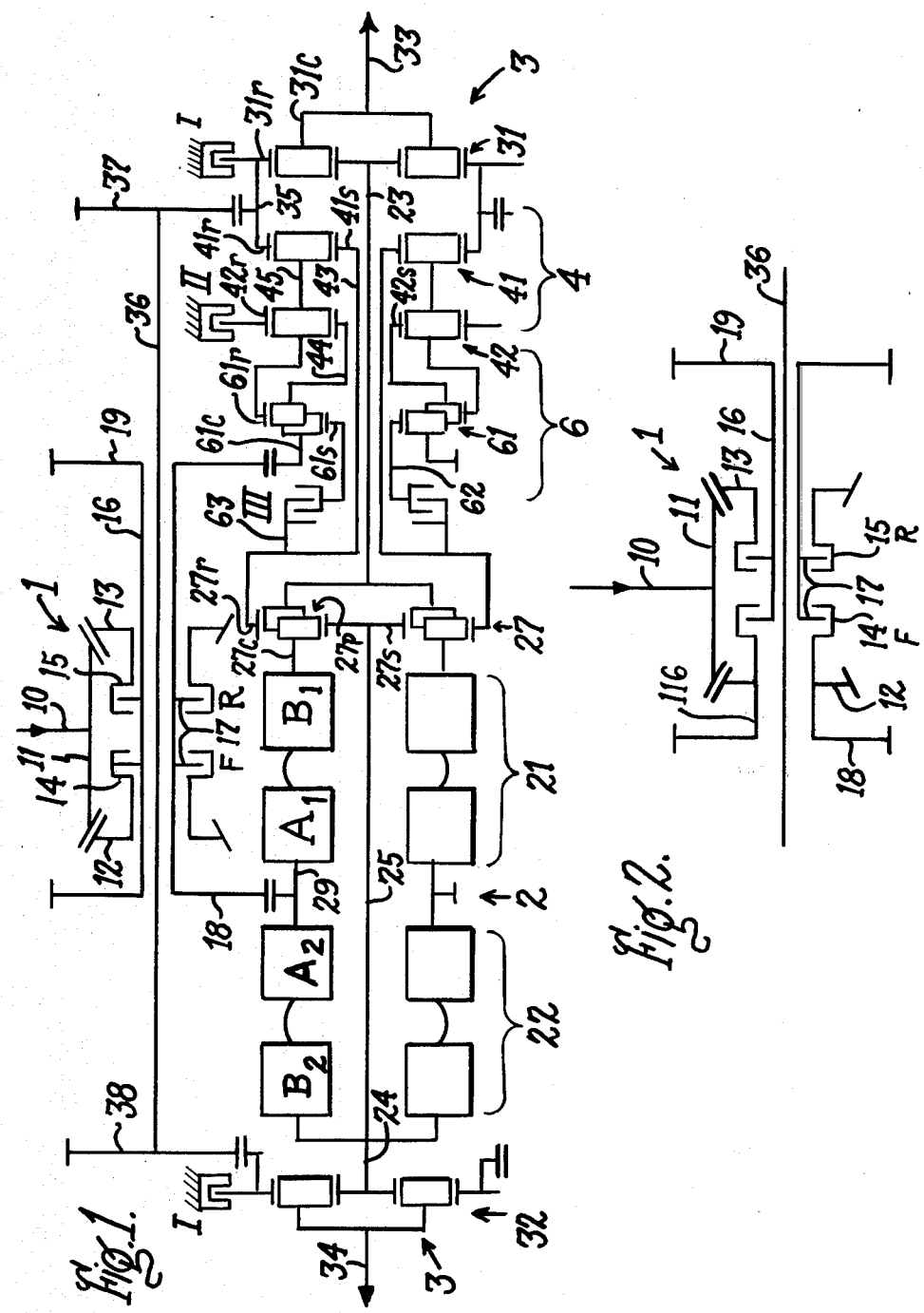

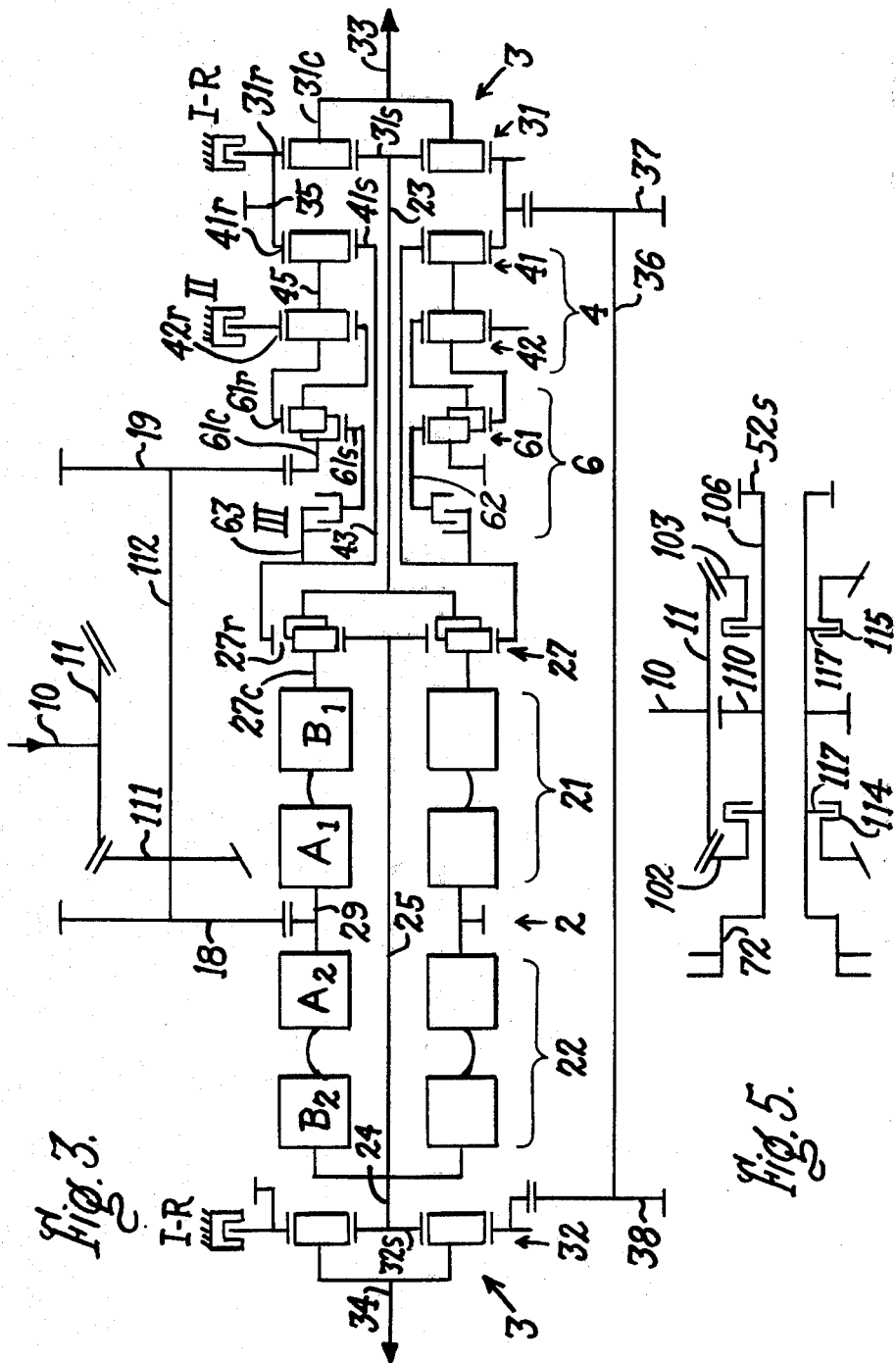

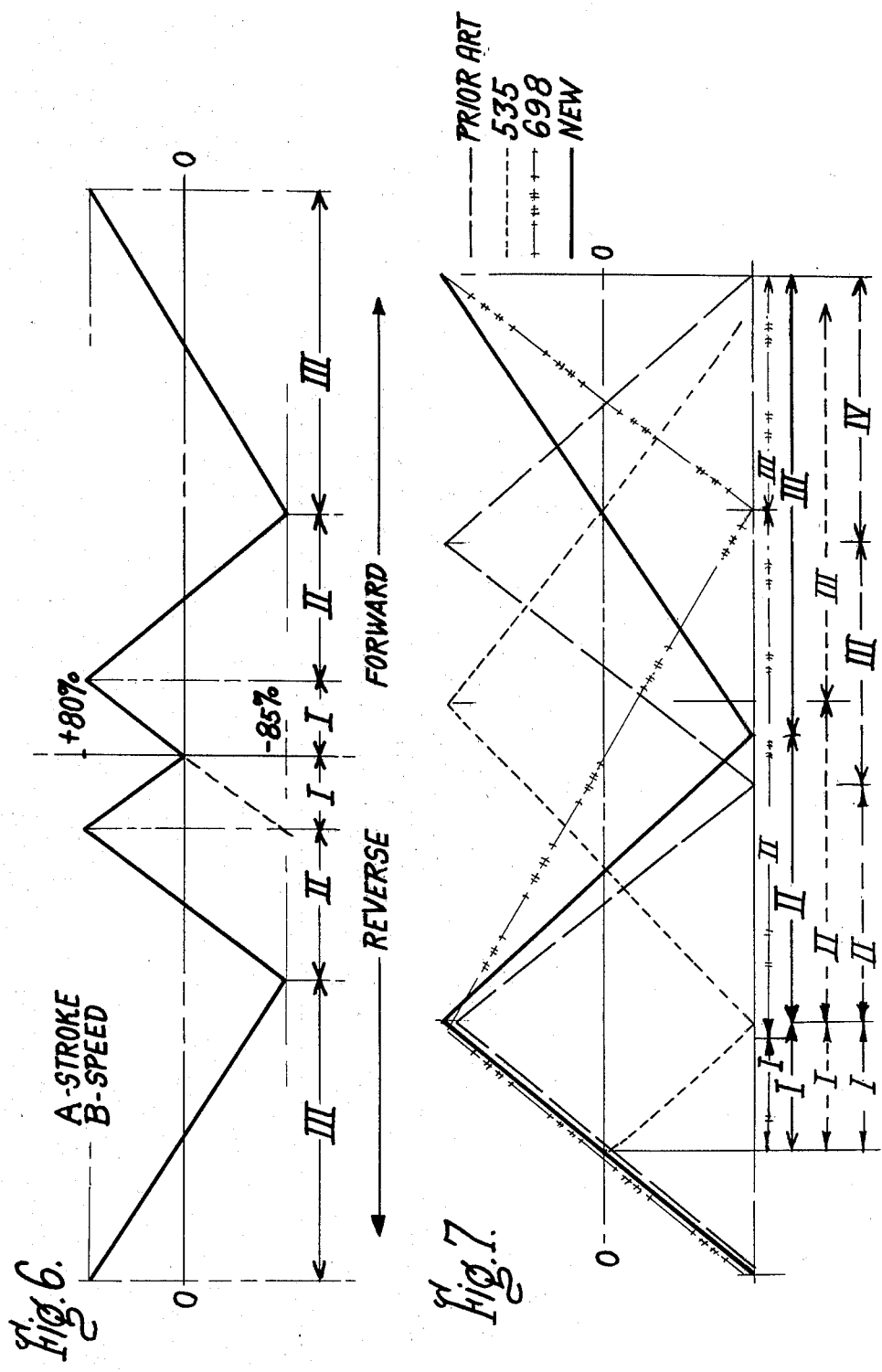

HYDROMECHANICAL STEERING TRANSMISSION

BACKGROUND OF THE INVENTION

1. Field of the Invention

This invention pertains to synchronous shifting multirange hydromechanical steering transmissions for tracklaying or skid-steered wheeled vehicles having hydraulic components to provide continuously variable hydrostatic drive ratios and mechanical components wherein selective operation of clutches or brakes causes the transmission to operate in a plurality of distinct hydrostatic, hydromechanical or mechanical ranges and wherein steering is effected by using one or more hydrostatic devices to impose a speed differential or difference between left and right outputs. More specifically, this invention pertains to such transmissions having internal integral steering resulting from use of the same hydrostatic components for both drive and steer rather than from use of dedicated hydrostatic components solely to impose a difference of speed to left and right outputs to effect steering (sometimes referred to as "steer-over"). In particular, this invention pertains to that class of multiple range steering transmissions which also have distinctly different speed and torque ratios in the various ranges without having steer reversal, i.e., with "steer positive" steering and without having clutches in the steer path. In this respect, the speed and torque ratios referred to are understood to be the ratios existing between the output from the included hydrostatic component and the transmission output with the speed and torque ratios being related as inverse functions. Measurement is between the hydrostatic and final outputs, especially in a split output transmission, because the ratios are fixed between transmission input and the input to the hydrostatic component and infinite between the input and output of the hydrostatic component, i.e., within the hydrostatic component. A split output hydromechanical transmission as the terminology is established in the art (Tuck "Split Power Transmission,", U.S. Pat. No. 3,433,095) is one in which a plurality of power paths from input to output are joined by a final power combining unit. In the split output example, the combining unit receives power in one path directly from transmission input and in another path from input via an included hydrostatic unit as opposed to a split input (Polak, "Input-Split Hydromechaniced Transmission" U.S. Pat. No. 3,982,448).

2. Description of Prior Art

The transmission of Polak, U.S. Pat. No. 3,596,535, is an example of synchronous shifting multi-range hydromechanical steering transmissions using dedicated hydrostatic components for steering, i.e., a "steer-over" transmission. Polak is of particular interest because the different speed and torque ratios in different ranges are shown by the slope of the lines in FIG. 2 of that patent. The transmission of Tuck, U.S. Pat. No. 3,590,658, is one example of synchronous shifting multi-range hydromechanical steering transmissions using internal steer. However, this transmission is really two coordinated truck (single output) transmissions which have clutches in the steer path and require coordination of range shifts which is in turn complicated by the fact of steer reversal. The transmission of Polak, U.S. Pat. No. 3,538,790, is another example of a synchronous shifting multirange hydromechanical steering transmission having integral steer. It is full reversing, has a hydrostatic low range and a hydromechanical high range and has two mirror-image halves (i.e., two joined truck transmissions). The transmission disclosed in U.S. Pat. No. 3,815,698 (Reed) is a more pertinent example of a synchronous shifting multi-range hydromechanical steering transmission having positive internal steering. This transmission which is a predecessor model to the transmission forming the subject matter of this application has a hydrostatic reverse and first forward range and hydromechanical second and third forward ranges in which the speed and torque ratios, as defined above with respect to the field of invention, of second range are different from that of the first and third ranges which are identical. A four range modification of that transmission has been built and tested in which the fourth range has the same speed and torque ratios as second range and has the same relationship to third range as the second range has to the first and reverse range. The transmission disclosed in U.S. Pat. No. 3,861,240 (Nolan and Reed) is a synchronous shifting multirange hydromechanical truck transmission having hydromechanical reverse, first, second and third ranges which as stated therein (Column 8, lines 4-14) and illustrated in FIG. 2, provides a different and distinct torque ratio between the included hydrostatic transmission and the output in each forward range. (The torque ratio of reverse is the same as first range.) No infinitely variable hydromechanical steering transmission with internal steering (whether or not positive) having a different and distinct torque ratio in at least three forward ranges has been identified in the prior art.

BRIEF SUMMARY OF THE INVENTION

This invention provides an infinitely variable split output synchronously shifting multi-range hydromechanical steering transmission having a hydrostatic first range in its full reversing configuration and a hydrostatic reverse and first range in its other than full reversing configuration and additional second and third hydromechanical ranges in both configurations. A difference in right and left output speeds, i.e., steering differential, can be obtained in all ranges without steer reversal (i.e., "steer positive") and without clutches in the steer path, by the hydrostatic components comprising the first range which also provide the hydrostatic power path for the hydromechanical ranges. Steer and propulsion ratios are independent from each other and, as a result of that independence, each of the three ranges can be made to have an independent and distinct propulsive torque ratio while retaining the same steer torque ratio which can be a ratio distinct from the propulsion ratios. The independence of torque ratios permitting the transmission to have less torque and an extended speed range in each successively higher speed range is the principal contribution of this invention which fulfills a need in the prior art for a multi-range hydromechanical steering transmission with internal steering wherein gear ratios can be individually engineered in each range to best meet all requirements of torque, speed, vehicle weight, etc.

DESCRIPTION OF THE DRAWINGS

FIG. 1 is a schematic illustration of an embodiment of the invention having a single major axis and full reversing.

FIG. 2 is a schematic illustration of an alternative full reversing mechanism to that used in the embodiment of FIG. 1.

FIG. 3 is a schematic illustration of a modification of the single major axis embodiment of the transmission illustrated in FIG. 1 which does not have full reversing.

FIG. 5 is a schematic illustration of an alternate input drive to that shown in FIG. 4 providing for full reversing in the dual major axes embodiment.

FIG. 6 is a graphic display, referred to as a stroke diagram, of a transmission according to the invention showing the relationship between the capacity of a variable displacement hydrostatic pump with the corresponding speed of its hydrostatic motor and transmission output speed.

FIG. 7 is a comparative stroke diagram which permits comparison of the slopes of the stroke lines of a transmission according to the invention with those of prior art transmissions.

FIG. 9 is a schematic illustration of the two major axes embodiment of FIG. 4 in which a modified third range gear set having single pinion planetary gears is used.

DETAILED DESCRIPTION

GENERAL

Figure 4:
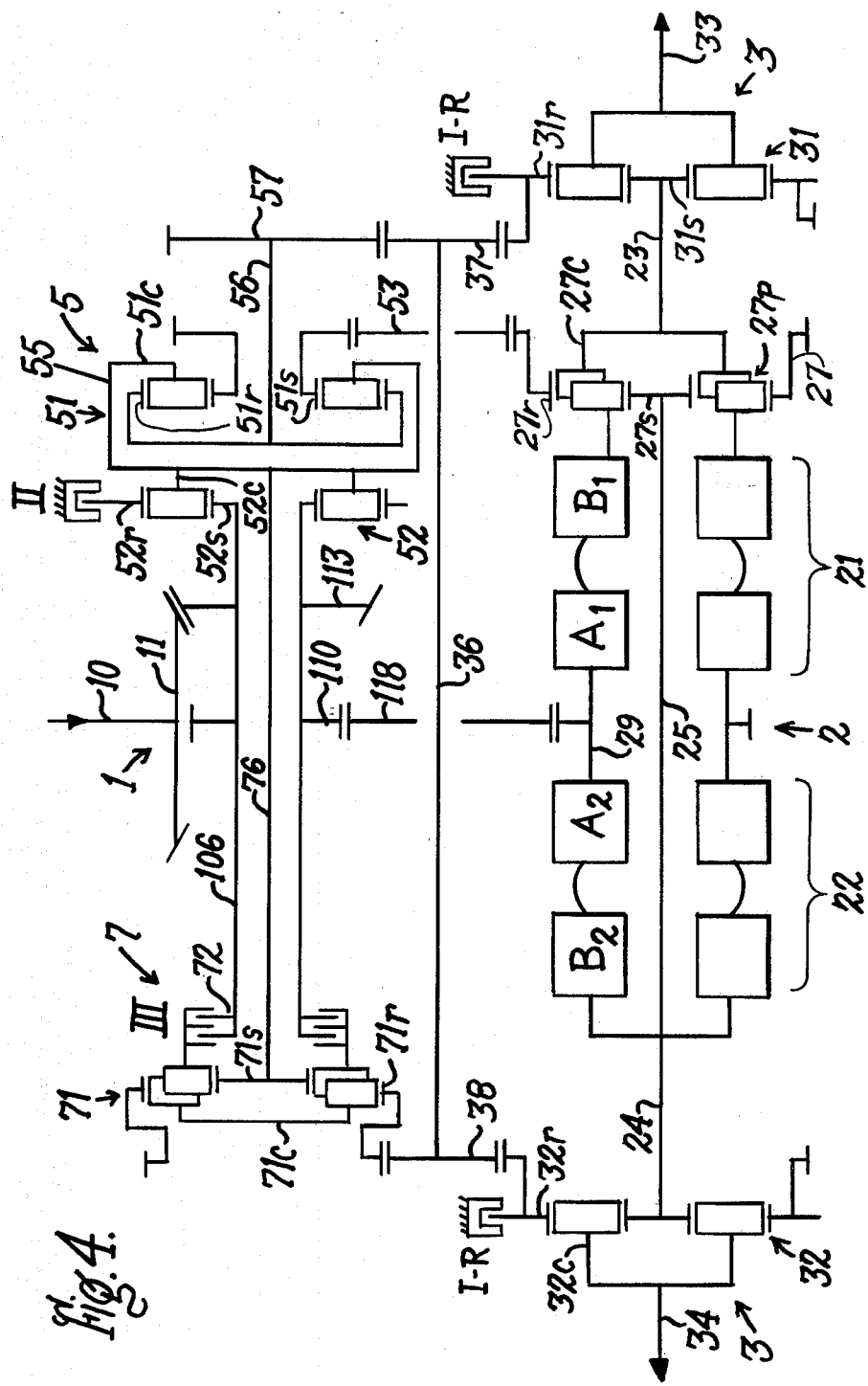
FIG. 4 is a schematic illustration of another embodiment of the invention having two major axes.

Multi-range hydromechanical steering transmissions, according to this invention, are made up of components as illustrated in FIGS. 1 through 5 of the drawings wherein reference numerals indicating components designate both identical and equivalent components and include an input gear train 1, a first range and steer mechanism 2, output gears 3 and additional gear components 4, 5, 6 and 7 which are used to provide two additional hydromechanical ranges. The input gear train 1 supplies power simultaneously to the hydrostatic components 21 and 22 and to the additional range gear components. The hydrostatic components using infinitely variable pump units A and motor units B can produce a hydrostatic output over a range of speed from a full forward to a full reverse. The hydrostatic output itself is directed to drive shafts through output reduction gearing 3 to constitute a first range which also provides steering by means of offsetting the capacities of the pump units A to create a difference of speed between the motor units B. The additional range gearing components 4, 5, 6 and 7 receive input both from input component 1 and from the hydrostatic mechanism 2 and serve to add additional inputs to the output reduction gearing 3 to produce a plurality of hydromechanical speed ranges sequentially in excess of that produced by the first range which is hydrostatic as illustrated. Steering in the additional ranges is still obtained by differential capacity settings between the hydrostatic pump units A which will cause the motor units B to produce right and left speed differences to the output gearing to produce a steer effect which is independent of the range in which the transmission is operating. The unique characteristics of this particular transmission are (1) the use of the average of motor or B block, speeds as the input to the additional range gearing from the hydrostatic component so as to completely separate hydrostatic propulsion in the several additional ranges from speed fluctuations resulting from steering speed difference generated hydrostatically and (2) the independence of the speed and torque ratios in a minimum of three ranges which is made possible by use of the B average speed as the basic hydrostatic input to the hydromechanical ranges. Although not illustrated or described in detail, the torque ratio of first range can also be made independent of steering torque by using B average rather than each B individually for first range propulsion. The unique features will be more thoroughly explained in connection with the operation of the transmission.

SINGLE MAJOR AXIS EMBODIMENTS

The invention can be implemented with major components located on a single axis as illustrated in FIGS. 1 and 3 which in themselves differ from each other by the fact that the FIG. 1 embodiment is a full reversing transmission whereas the FIG. 3 embodiment is not and employs a single reverse and first range with second and third ranges being only forward ranges. In the embodiments of FIG. 1 and FIG. 3, the major components of hydrostatic first range and steer mechanism 2, output gearing 3, second range gear train 4, and third range gear train 6 are all aligned on the main transmission axis defined by the output shafts 33 and 34 and the center shafts 23 and 25 running through those components. In addition, there is a minor axis determined by the cross shaft 36 and the input gear train 1.

Input Gear Train

The input gear train 1 in the single major axis embodiment of the invention illustrated in FIG. 1 includes an input shaft 10 which drives bevel gear 11 in turn driving two beveled clutch gears 12 and 13, each of which carries a clutch mechanism 14 and 15 designated either F for forward or R for reverse. The input gear train in this embodiment also includes hollow shaft 16 carrying clutch elements 17 and transfer gears 18 and 19 which are used to transmit the input power to other components with transfer gear 18 driving hydrostatic component 2 and transfer gear 19 providing mechanical drive input to the second and third range gear trains 4 and 6. Transfer gears 18 and 19 drive in the same direction with that direction depending on whether forward clutch 14 or reverse clutch 15 is engaged. This provides for a full reversing system in that the transmission components will operate in the same fashion in each direction except that the direction of rotation of all parts will be opposite in reverse operation from the direction of rotation in the forward mode.

A modified input gear train 1 is illustrated in FIG. 2 which also causes the transmission to be a full reversing transmission but reverses the direction of movement of only the mechanical input into gear trains 4 and 6 which constitute the second and third range 3 mechanisms and relies on the use of the inherent reversibility of the hydrostatic components along with the mechanical reversing of the mechanical gear train to effect full reversing. In this alternative implementation of the input gear train, the parts are the same except that the transfer gear 18 is connected by means of an additional hollow shaft 116 to beveled clutch gear 12 rather than to hollow shaft 16 with the result that transfer gear 18 and therefore the input into the hydrostatic component 2 always turns in the forward direction rather than being reversed on actuation of the reverse clutch 15 as does transfer gear 19 and the mechanical gear train components 4 and 6. The difference in operation between these two embodiments will be explained in connection with the overall operation.

The embodiment illustrated in FIG. 3 is principally the same transmission as that illustrated in FIG. 1 but is not full reversing and therefore has a single first and reverse hydrostatic range and two additional forward hydromechanical ranges. This difference is accounted for by the fact that the input component 1 includes only input shaft 10, bevel gear 11, an additional bevel gear 111 driving a shaft 112, and the two transfer gears 18 and 19 driven by the shaft 112. In addition, cross shaft 36 with cross shaft transfer gears 37 and 38 are located on another minor axis separate from that of the input gears. This latter feature of cross shaft location is optional, demonstrates a flexibility available for packaging considerations, and is not limiting as the cross shaft could be placed inside of a hollow shaft 112 similar to the FIG. 1 embodiment.

Hydrostatic Steer and First Range

Although the embodiments of the invention illustrated in FIGS. 1 and 3 could be implemented using any compatible pair of hydrostatic pump and motor units 21 and 22 wherein at least the pump A has infinitely variable capacity, the best mode contemplated for implementation of this invention is by use of ball piston hydrostatic devices as disclosed and illustrated in FIGS. 2 and 3 of U.S. Pat. No. 3,815,698. Therefore, the component 2 as illustrated in FIGS. 1 and 3 are made up of variable capacity positive displacement ball piston pumps A1 and A2 connected to the input gear train by means of gear 29 and fixed capacity positive displacement motor units B1 and B2, each in a closed hydraulic cycle relationship with its respective hydraulic pump A whereby the B units can be made to turn at infinitely variable speeds in either direction corresponding to the capacity of the A units. Each of the motor units B is connected to a hydrostatic output shaft with the motor unit B2 being connected directly to shaft 24 and with the motor unit B1 being connected to shaft 23 by means of planetary gear set 27, the purpose of which will be more fully explained below. By varying the displacement of the pump units A, the shafts 23 and 24 can be driven at infinitely variable speeds from a maximum in one direction to a maximum in the other direction, either independently or in unison. Each of the hydrostatic output shafts 23 and 24 deliver the output speed of the hydrostatic motor B to which it is attached to the sun gear of the corresponding output planetary set 31 or 32 of the output gearing 3. For convenience and clarity, the elements of planetary sets, i.e., the sun, the ring, the carrier and the planetary gears, are designated by the planetary set reference number followed by the appropriate letter s, r, c or p indicating the element so that the sun gear of planetary set 31 is designated 31s. This, therefore, permits reference to every element without innundating the drawings with reference numbers. If the first range brakes indicated by I in FIG. 1 are activated, transmission output shafts 33 and 34 will be driven by the B units through the output planetary sets 31 and 32 at a sun to carrier reduction so that the output speed of each of the transmission output shafts in first range bears a direct relationship to the speed of the respective B unit.

In the FIG. 3 version, which is not full reversing, with the brakes indicated as I-R engaged, the vehicle can be driven in a hydrostatic range from zero to full speed in either forward or reverse direction according to the direction of rotation and change of displacement of the pump units A to constitute a combined first and reverse range. With the input component 1 illustrated in FIG. 1, however, it is not contemplated that the B units would be caused to rotate in a reverse direction except for pivot steer because the input gear train provides for full reversing. The input gear train illustrated in FIG. 2, however, where only the mechanical drive transfer gear 19 is reversed by using forward and reverse clutches 14 and 15, produces a still different mode of operation in that reverse is obtained by changing from clutch 14 to clutch 15 and simultaneously reversing the hydraulics by use of the inherent reversing capability of pumps A. Steering in any of these implementations is obtained by relative differences in the capacity settings of the pump units A with the result that the B units run at speeds sufficiently different from each other to produce output speed differences between shafts 33 and 34 to cause the vehicle to change direction. Steering through the use of this mechanism is infinitely variable between no steer and full pivot steer wherein pumps A1 and A2 would be stroked in opposite directions causing B1 and B2 to run, one forward, one in reverse.

Higher Ranges

In the FIGS. 1 and 3 embodiments of the transmission, second and third ranges are provided by the gear train components indicated generally at 4 and 6 which are identical in the two implementations. The second range component 4 is made up of the second range outer planetary set 41, the second range inner planetary set 42 and brake II whereas the third range component 6 includes third range planetary 61 and clutch III and connecting gear elements. Both the second and third ranges are hydromechanical because there are both mechanical and hydrostatic inputs into components 4 and 6. As noted in the summary of the invention and in the general description of the invention, a primary characteristic of a transmission according to this invention is the fact that the hydrostatic contribution to the hydromechanical ranges, which is derived from the same hydrostatic components that provide right and left speed differences for steering, is isolated from the steer torque and speeds. This is accomplished through the use of planetary set 27, as one example of a speed averaging device which can be applied to obtain the average of the B block output speeds (i.e., "B average") for use as the hydrostatic input into the second and third range components. As already noted, hydrostatic motor B2 drives hydrostatic output shaft 24 directly whereas hydrostatic motor B1 drives hydrostatic output shaft 23 through the carrier of planetary set 27. Because motor B1 drives carrier 27c of planetary set 27 and motor B2 drives the sun 27s of that set by means of extension shaft 25, the average of B1 and B2 speeds is produced on a ring 27r of the planetary set. Planetary set 27 is illustrated as a double pinion planetary set, i.e., having dual pinions 27p, as a practical way to obtain the proper ratios to produce the average output desired and is the same type of planetary gear set as illustrated in FIG. 4 of U.S. Pat. No. 3,815,698. While the B1 and B2 outputs are transferred to the transmission output sun gears, to provide for steering in second and third ranges, the B average speed as generated on ring gear 27r provides a hydrostatic input to second and third range propulsion and is passed from there to sun gear 41s by means of hollow shaft 43 concentric about shaft 23 to drive sun 41s hydrostatically without variation due to steering.

Second Range

In second range, hydrostatic input is provided on the sun of outer second range set 41 as noted and mechanical input is provided from transfer gear 19 to the sun of inner second range set 42 through the carrier 61c of set 61 and the additional concentric hollow interconnecting shaft 44. Therefore, in the second range component 4 with mechanical input on sun 42s and with brake II activated to ground ring gear 42r, the mechanical input is placed onto second range interconnecting hollow shaft 45 and carrier 41c at a sun to carrier reduction as produced by planetary set 42. The reduced mechanical speed on carrier 41c in combination with hydrostatic drive on sun 41s produces a resultant speed function on ring 41r which is directly conveyed to output ring 31r by means of gear 35. With brake II engaged and brake I disengaged, the second range component output speed acting on ring 31r and the B1 hydrostatic output on sun 31s cooperate to produce a second range output on carrier 31c which is a function of mechanical input speed and torque, B average speed, B1 speed, hydrostatic torque and the ratios of planetary sets 42, 41 and 31. The gear ratios of these planetary sets, therefore, can be calculated to give a desired torque ratio and speed range which is independent of and different from the ratios and speeds in the other ranges. This will be further commented on below.

The same second range output applied to ring 31r is also applied to ring 32r of set 32 by means of cross shaft 36 and transfer gears 37 and 38 where it is combined with B2 speed to provide an output on shaft 34 differing from that on shaft 33 only by the speed difference or differential used to effect steering. In the embodiment of FIG. 1, the cross shaft 36 runs through hollow shaft 16 of the input gear train 1 so as to reduce the total amount of space necessary for packaging of the transmission. This is not necessarily a limitation on the transmission and the cross shaft can be located on its own separate axis as indicated in FIG. 3 where the cross shaft 36 and transfer gears 37 and 38 are on separate axes but still serve to transfer second and third range outputs from ring 31r and gear 35 to ring gear 32r. This second range component 4, as will be explained in connection with the embodiment of FIG. 4, produces the same result as the second range gear train of U.S. Pat. No. 3,815,698.

Third Range

Third range drive is created in the third range component 6 of FIGS. 1 and 3 in cooperation with second range planetary set 41. Hydrostatic drive is applied to the sun 61s from ring 27r through drums 63 and 62 and clutch III which is engaged to activate the third range gear train to combine hydrostatic and mechanical drives at gear set 61 to generate an intermediate hydromechanical product on ring 61r. The intermediate hydromechanical third range product is then transferred from ring 61r through the carrier of the inner second range gear act 42 and hollow shaft 45 to the carrier of the outer second range gear set 41 where a further combination with the hydrostatic B average speed running on sun 41s produces the third range hydromechanical drive on ring gear 41r. This newly generated third range hydromechanical output is then transferred to gear 35 and from there to ring gears 31r and 32r, the latter through transfer gears 37, 38 and cross shaft 36. Thereafter, a further combination is made in sets 31 and 32 with the appropriate B speed to produce the third range final output on transmission output shafts 33 and 34. Again, with the proper selection of gear ratios in the planetary sets, the third range can be designed to produce the desired torque ratio and speed range independently of steering and without dependence on the torque ratios or speed of other ranges except to the extent that the gear ratios of planetary sets 31 and 41 are involved in both the second and third ranges and must be compatible with both ranges.

DUAL MAJOR AXES EMBODIMENTS

The embodiment of the invention illustrated in FIG. 4 performs in the same manner as the embodiment of FIG. 1 but has structure charges to permit packaging in a different shape. This is accomplished by organizing the components along two major axes rather than on a single major axis. In effect, the second and third gear components are removed from the major axis defined by transmission output shafts 33 and 34 and are placed on a second major axis defined by shaft 76 and packaged in combination with the input gear train 1 in lieu of cross shaft 36 which is on its own axis. This package, therefore, resembles its predecessor transmission which forms the basis of U.S. Pat. No. 3,815,698 and can be used as a replacement for that transmission. In FIG. 4, the components which are sufficiently identical with the components in the FIG. 1 embodiment are designated with the same reference numbers whereas the components which are relocated or changed in the FIG. 4 embodiment are numbered differently from their FIG. 1 counterpart. As illustrated in FIG. 4, the major components include an input gear train 1, a hydrostatic reverse and first range and steer component 2, and output gears 3 which are in effect the same as components of the FIG. 3 embodiment and a second range component 5 and a third range component 7 which differ in structure from the components 4 and 6 of FIG. 3 but which act on the same principle to perform functions equivalent to those of the FIG. 1 and FIG. 3 embodiments. In the following description, the similarities and differences will be pointed out.

Input Gear Train

The modification of input gear train 1 illustrated in FIG. 4 has a bevel gear 113 attached to a hollow shaft 106 which is driven by the bevel gear 11. Shaft 106 carries a gear 110 which meshes with a transfer gear 118 which inserts mechanical drive into the hydrostatic component 2 by means of hydrostatic input gear 29 similar to the input from transfer gear 18 in FIGS. 1 and 3. Mechanical drive is transferred to the second range component 5 by means of sun gear 52s of planetary set 52 which is attached directly to shaft 106 and is inserted into the third range component 7 by means of the third range clutch III of which one element of the structure 72 is driven by shaft 106. This input gear train does not provide for reversing so that the first range is a combination first and reverse range, as will be described in connection with the operation of this transmission.

An alternative full reversing input gear train for the dual major axes embodiment of FIG. 4 is illustrated in FIG. 5 wherein two beveled clutch gears 102 and 103 are driven by bevel gear 11. Two clutch mechanisms 114 and 115, one attached to each of the bevel gears 102 and 103 for engaging with clutch plates 117 to drive hollow shaft 106 selectively in either direction, provide for a full reversing mechanism for the FIG. 4 embodiment of the invention.

Hydrostatic Steer and First Range

Steer and first range operation of the dual major axes transmission embodiment shown in FIG. 4 is identical to that of the FIGS. 1 and 3 embodiments except for the fact that the shaft 23 interconnecting carrier 27c and sun gear 31s is short because it does not have to extend through second and third range components. With the input gear train illustrated in FIG. 4, the hydrostatic first range is also the reverse range, depending on the direction of stroke of hydrostatic pump units A1 and A2 for reversing whereas with the modified input train shown in FIG. 5 a full reversing is obtained and pump units A1 and A2 are always stroked in the same direction except for a pivot turn from zero vehicle speed in which case the one A unit would be stroked in reverse.

Second Range

In the dual major axes embodiment of a transmission according to this invention as shown in FIG. 4, second range is provided by the component generally indicated at 5 which includes second range outer planetary set 51, second range inner planetary set 52 and brake II wherein the sun 51s of the outer set is driven at B average speed by means of B average transfer gear 53 interconnecting with ring gear 27r of the B average planetary set 27. Mechanical input, as already noted, is supplied to the sun gear 52s of the inner second range set. When ring 52r of the inner set is held stationary by means of brake II, carrier 52c is driven mechanically by the input at a sun to carrier reduction and by means of connector 55 drives the carrier 51c of the outer set. With carrier 51c being driven mechanically and sun 51s being driven hydrostatically, ring 51r, shaft 56 and transfer gear 57 are driven hydromechanically as the sum of the two inputs. This hydromechanical drive is transferred to the ring gears 31r and 32r of the output gear sets by means of gears 37 and 38 and cross shaft 36. Although the structure is a little different from the single major axis implementation, ratios and operation are the same. In each case, the sun gear of the inner second planetary set is driven mechanically with the ring gear locked by the second range brake to produce a sun to carrier reduction which is used to drive the carrier of the outer second range planetary set wherein the sun gear is driven hydrostatically at B average speed to produce a hydromechanical drive on the outer second range ring gear which is then transferred by a gear train to the ring gear of the output planetary sets. The fact that the mechanical drive is obtained directly from the input gears in the dual axes model rather than through the carrier of the third range planetary set as in the single axis model is of only a packaging significance. In both cases, the torque ratio of the output is independent of the other range ratios and independent of steering. Also, to this extent and to this point, structure and operation of this FIG. 4 embodiment of this transmission is the same as the transmission forming the basis of U.S. Pat. No. 3,815,698.

Third Range

Third range in the dual major axes embodiment of this invention as shown in FIG. 4 is provided through the action of planetary set 71 and third range clutch III in cooperation with outer second range set 51. This is the only portion of the two embodiments, i.e., the single axis and the dual axes, that involves a significant structural difference. Third range in the dual axes embodiment of FIG. 4 operates from application of input mechanical speed through clutch III from cross shaft 106 to the carrier of the third range set 71 and application of a complex hydromechanical input to the third range sun gear 71s which is obtained from the second range carrier 51c. Speed fluctuation for third range is derived from the B average input even though it is placed on the outer second range sun 51s and transmitted to third range sun 71s as a complex function as a result of the interconnections between gear sets 51 and 71. Also, because of this interconnection between gear sets 51 and 71, the cooperative output of ring gears 51r and 71r placed on cross shaft 36 must be regarded as the output of the third range component 7. Although this appears to be a different function than that of third range in the single major axis embodiment, it is still an equivalent function having independent torque and speed ratios which can be, because of the proper selection of gear ratios in the planetaries involved, torque and speed ratios equivalent to those produced in the single axis embodiment. The implementation of the third range component 7 by use of the planetary set 71 having dual pinions as illustrated in FIG. 4 is not limiting on the invention. Appropriate ratios can be obtained in many or most instances by use of a single pinion planetary set at 71 which would have a sun gear 71s connected by shaft 76 to the dual second range carrier 52c, 51c, have a ring gear 71r driven by mechanical input through the third range clutch III and having a carrier 71c used as output. In each case, B average speed, mechanical input speed and the ratios of the outer second planetary set 51 and the third range planetary set 71 are parameters determining the function.

Although not a necessary part of a transmission according to this invention, the transmission implementations disclosed could be modified to provide different torque ratios between first range and steer or to include one or more additional ranges through relatively simple changes. For example, a fourth rangge could be added to this transmission by using a technique already applied to the predecessor transmission of U.S. Pat. No. 3,815,698 Reed (and also disclosed in U.S. Pat. No. 3,596,535 (Polak) (clutch 96 in FIG. 1 and as explained in column 6, lines 8-27)) by adding a clutch connected between two elements to lock up the "inside" second range planetary set (42 in FIGS. 1, 52 in FIG. 4) (used as a reduction gear in second range) and appropriately adjust gear ratios to provide a 1:1 mechanical input drive to carrier 41c or 51c for the fourth range. Modification to cause first range to have a torque ratio different from steering torque if that should be desired could be accomplished in the implementation illustrated by providing a first range interconnection or power path between ring 27r and the output planetaries. Such modifications which would produce a hydromechanical first range if the power path incorporated a mechanical input would cause the transmission to have mutually exclusive torque ratios among steer and all three ranges.

OPERATION

Operation of the full reversing single major axis transmission embodiment of FIG. 1 is best explained by reference to that FIGURE and FIGS. 6 and 8 simultaneously. Military or other heavy vehicles using transmissions of this type are generally propelled by a diesel engine which is operated at or near a constant speed. With such a power plant providing power at shaft 10 and with the hydrostatic units A1 and A2 set for zero displacement and range brake I engaged, the engagement of either clutch 14 or 15 will prepare the transmission for operating in one direction. Assuming that the clutch 14 which is also designated F for forward is engaged, transfer gears 18 and 19 will be caused to rotate in the direction corresponding with forward vehicle movement. Rotation of transfer gear 19 will cause a rotation of various elements in the second and third range gear trains 4 and 6 but with no output since ring gear 41r remains fixed along with ring gears 31r and 32r as a result of the engagement of range brake I. In the hydrostatic unit 2, hydrostatic input gear 29 is driven by transfer gear 18 and causes hydrostatic units A1 and A2 to rotate, but since they are initially set for zero displacement there is no resulting movement of motor units B1 and B2.

First Range

As the displacement of the A units is increased in the desired direction, the motor units B1 and B2 attain a corresponding speed proportional to the displacement of the A units causing a corresponding rotation of the hydrostatic output shafts 23 and 24 and also transmission output shafts 33 and 34 at a speed determined by the sun to carrier reduction in output gearing 3 driving against ring gears 31r, 32r held stationary by brake I. FIG. 6 illustrates this operation in first range forward with the B speed and the A stroke advancing along the solid line indicated for first range from zero to eighty percent of full speed which is the predetermined range I to range II shift point. Eighty or some other quantity less than one hundred percent is selected in part to make available an additional speed in each B unit to provide for a steering in either direction. The solid line in FIG. 6 also shows the full reversing action of the transmission and more significantly presents a graphic portrayal of the independence of torque ratio of the ranges by the fact that the slope of the line in each range is different. This will be examined more fully below. The dashed line in the first range reverse area represents action of the nonfull reverse embodiment in operation in reverse. A further graphic portrayal of this action is shown in FIG. 8 in which the line labeled "G" (long dashes) shows the speed increase of the B units and the output sun gears 31s, 32s from zero in the forward direction (without steering differential) and also shows that the solid line representing the final output through the output carriers 31c, 32c increases at a rate reduced by sun to carrier ratio. During this same time, ring gear 42r of the second range inner planetary set 42 (which had to run backwards initially because carrier 42c was held stationary by the cooperation of brake I and the initial zero speed of sun 41s and zero average B speed) has accelerated from its negative speed to zero as indicated by the line "F" (shorter dashes) indicated in FIG. 8. At this point, a synchronous shift can be made into the hydromechanical second range by actuation of brake II to "ground" ring gear 42r and release of brake I.

Second Range

Figure 8:
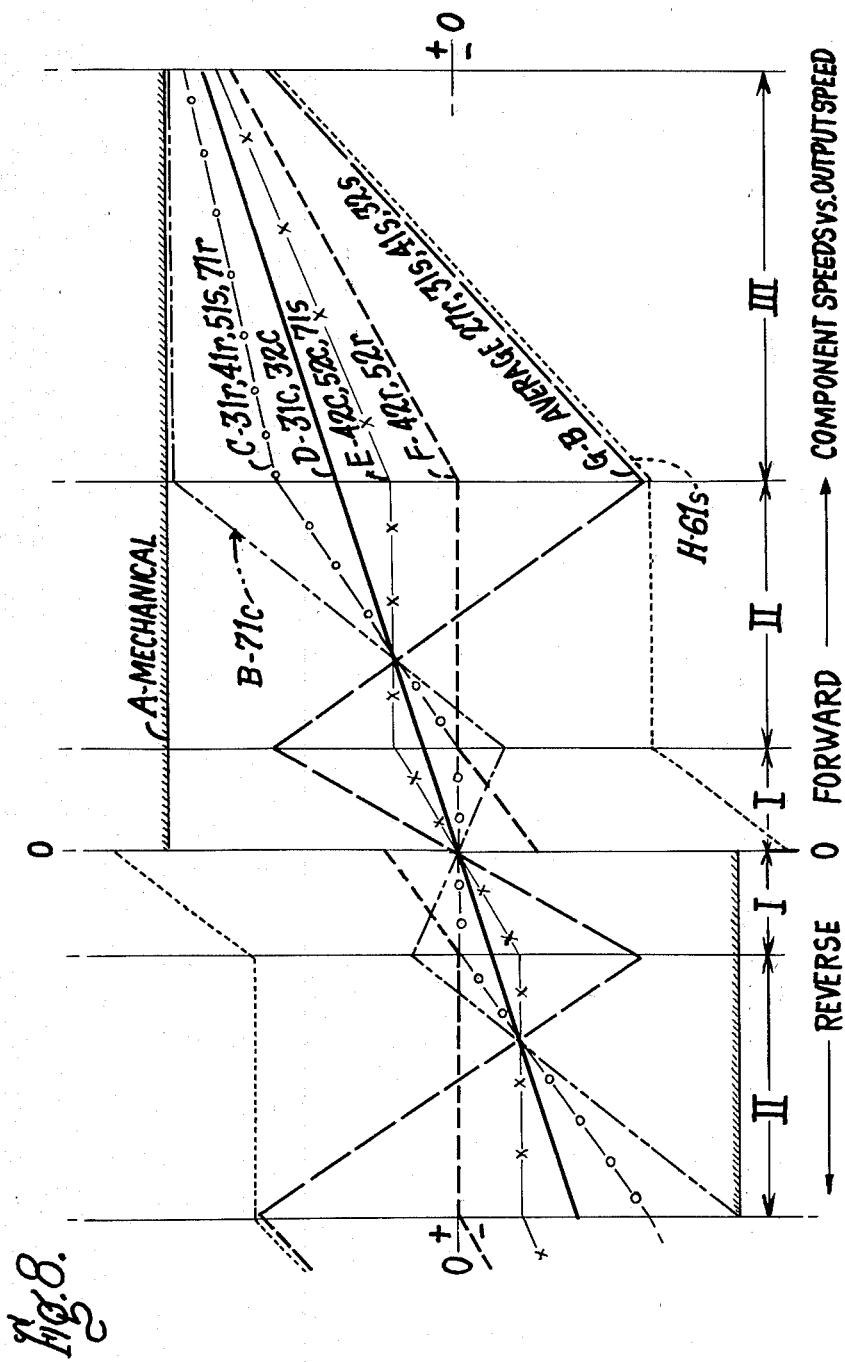
FIG. 8 is a composite graphic display of the speeds of selected components of both of the principal configurations of the transmission which facilitates comprehension of its operation.

After the shift to range II, the A units are de-stroked, decreasing their capacities and slowing the B units as indicated by the reverse slope of the lines in FIG 6 and line "G" in FIG. 8. As this I-II shift takes place, ring gear 41r of the outer second range set and ring gears 31r and 32r of the transmission output sets which have just been released by brake I begin to move in the forward direction, i.e., the direction which will add forward speed to the output carriers 31c and 32c, as shown by the line "C" in FIG. 8 (dashes separated by o's). Gear ratios are such that the increase of forward speed of ring gears 31r and 32r is sufficient to overcome the decrease of speed of the sun gears 31s and 32s which result from a slowing of the B units so that the resultant effect on output carriers 31c and 32c is a constant increase in speed of those output elements, as shown by the solid line "D" in FIG. 8 which continues a linear increase in speed. This continues through the node shown in the second range zone where several lines cross and through the point at which the capacity of the A units goes through zero and the B average speed goes negative and until the hydraulic units and output suns 31s and 32s reach the maximum selected negative speed point for the range II to range III shift, which for this transmission is eighty-five percent of full negative speed, again to allow a margin for steering differential.

Third Range, Single Axis

At the II to III shift point activation of the third range clutch III in the FIGS. 1 and 3 embodiments simultaneously with release of brake II connects third range sun gear 61s which has been running at shift point speed to B average so that, as the A blocks are stroked again toward the forward direction, the third range sun 61s accelerates from its negative speed along with B average as shown by the concurrence of the lines "G" and "H" in the third range zone in FIG. 8.

As noted above with respect to FIG. 6, the slope of the line "G" in FIG. 8 representing B average speed also illustrates the independence of torque ratio in the three ranges. In range III, the acceleration of sun gears 61s running against the constant speed mechanically driven carrier 61c causes the ring gear 61r of the third range set to accelerate from its second range speed which was at a sun to carrier reduction from mechanical speed as generated in set 42. It was reaction to these movements that had caused third range sun 61s to be running at a constant negative speed equal to the II to III shift point speed during second range operation as shown by the dotted line "H" in FIG. 8. As the A units are stroked in third range from the maximum second range capacity in the reverse direction toward the forward maximum capacity, the B average speed increases from its eight-five percentage negative speed, i.e., first slows to zero and then accelerates in the positive direction. The increase of B average speed of ring gear 27r is accompanied by a corresponding speed change in third range sun gear 61s as noted above and also of outer second range sun gear 41s and, with allowance for steering, the output sun gears 31s and 32s. These accelerations, when combined with the constant mechanical input to third range carrier 61c, cause a chain of events. As already noted, the increase of speed of sun gear 61s in combination with the constant speed of carrier 61c causes ring gear 61r of the third range set to accelerate, thereby accelerating the second range carrier 41c, 42c.

Acceleration of the second range carrier has no practical effect in the inner range II set 42, but the increase in the II range outer planetary set 41 in combination with the increasing speed of sun gear 41s causes a further increase in speed in the ring gear 41r which is tied to gear 35 and the ring gear 31r of the output set. These movements are illustrated in FIG. 8 where the line "E" (dashes separated by x's) represents the speed of third range ring 61r and the second range carriers, and the line "C" (dashes separated by o's) represents the outer second range ring and the output ring 31r. The simultaneous increase of speed of the output sun 31s which is also increasing with hydrostatic output and the output ring 31r provides a still further increase in speed in the output carrier 31c and the output shafts as shown by the line "D" in FIG. 8. The ultimate projection would be for all of these components to approach mechanical input speed as indicated by the crosshatched solid line "A" in FIG. 8, an impractical event as no leeway for steering would exist at or near such point. It is for this reason that it was stated above with respect to a potential fourth range that an appropriate modification of gear ratios would be required. The adjustment would cause the B average line "G" to intersect the mechanical speed line "A" at top speed for range III.

Third Range, Dual Axes

Third range implementation in the FIG. 4 embodiment is somewhat different and more complex to explain but produces an equivalent result. In the dual major axes configuration of FIG. 4, third range input speeds are produced in third range planetary set 71 which has its ring gear 71r geared to the output ring gears 31r and 32r by means of cross shaft 36 and transfer gears 37, 38. The sun gear 71s of this set is attached to the second range carriers by shaft 76. Third range is actuated by clutch III, clutching the carrier 71c to mechanical input speed present on shaft 106. This difference between the FIG. 1 and FIG. 4 implementations is reflected in FIG. 8 by the line "B" (dashes separated by two dots) representing the carrier 71c which for third range is clutched to the mechanical input represented by the crosshatched solid line "A". In third range at the II to III shift point, the second range carrier 52c was driven at a sun to carrier reduction as a result of mechanical input driving sun 52s, with ring gear 52r being held stationary by brake II. B average was also placed on the outer sun 51s so that the output gear train was driven by second range outer ring gear 51r at a speed resulting from the other two components in that set. At the II-III shift point speed with ring gear 51r continuing to run at a speed dictated by the output gear train when brake II is released and clutch III engaged, the second range carrier 51c, 52 c changes from an input to an output element of the second range component. Therefore, third range sun 71s is driven as a result of the speeds placed on the outer second range set 52. With the third range sun gear 71s being driven at a speed represented in FIG. 8 by the line "E" (dashes separated by x's) and the carrier 71c being driven at the constant mechanical input speed as represented by the crosshatched solid line "A", a speed near the average of those speeds is generated on ring gear 71r which then serves to drive the output ring gears 31r and 32r through the cross shaft 36 and transfer gears 37 and 38. This, of course, further accelerates the ring gear 51r of the outer second set as the speed increases, in turn further accelerating third range sun 71s. The net result is that this action in cooperation with a constantly increasing speed in output suns 31s, 32s in the positive direction causes a constantly increasing speed of the output planetary carriers 31c and 32c and output shafts 33 and 34 as shown by the upward direction of the lines in FIG. 8.

CONCLUSIONS

This transmission in two principal embodiments (single and dual major axes) constitutes an infinitely variable synchronously shifting multi-range split output hydromechanical steering transmission having internal steering, three ranges, positive steer in all ranges, no clutches in the steer path and an independent and distinct torque ratio in each of three ranges, a combination hitherto unknown in the art. This provides a torque and speed range flexibility in steering transmissions having internal steer which is comparable to that previously known only in truck (i.e., single output) transmissions and in steering transmissions using a "steer-over" steering system, i.e., having additional hydrostatic components dedicated to steering. As noted above with respect to FIG. 6, the independence of the speed and torque ratios of the several ranges is illustrated by the change in slope of the lines in the diagram representing the output speed of the hydrostatic component versus the output drive speed of the transmission as a measurement of the ratio of torque. This is based on and consistent with the definition of torque ratio as the ratio between the torque at the output of the hydrostatic component and the torque at transmission output as already explained in the Field of Invention. FIG. 7 is a comparison of this transmission with other steering transmissions noted above in the description of the prior art.

FIG. 7 is a composite of plots representing hydrostatic output speed or, in the terms used in this disclosure, B block speed versus transmission output speeds for several different hydromechanical steering transmissions which reflect the torque ratios of those transmissions in the various ranges. In FIG. 7, the line of long dashes as indicated in the key portion of the figure represents the hydrostatic propulsive output of transmissions known generally in the art in which there is an interdependence between ranges resulting from the repeated use of the same components with gears to merely displace the action of the hydrostatic drive to a different speed range and, therefore, maintain the same torque ratio in each range. The characteristic of that dashed line is that alternate segments of the line are parallel and adjoining segments are mirror images about the vertical lines representing shift points. The dotted line in FIG. 7 is copied directly from FIG. 2 of U.S. Pat. No. 3,596,535 to Polak without additional or interpretive information and is so labeled in the key. As noted in the foregoing description of prior art, the Polak transmission is an example of a synchronous shifting multi-range hydromechanical steering transmission using dedicated hydrostatic components for steering, i.e., a "steer-over" transmission. Polak's first three forward ranges are represented in FIG. 7 by range lines each having a slightly different slope which would indicate a different and independent torque ratio in each of these ranges. Although the Polak patent does not contain anything specific, either positive or negative on the matter, its design does not preclude obtaining a lower torque and a higher speed coverage in each of the successively higher first three ranges and is thereby regarded as having obtained that result even if the result was not recognized as a desired objective in the art. The presence of a fourth range which is not in accord with the principle is, in the absence of specific comment, evidence of a lack of recognition of the principle. Therefore, although the Polak transmission represents a limited defacto attainment of the decreasing torque in hydromechanical steering transmission having dedicated hydrostatic components for steering, i.e., a "steerover" system it does not provide a recognizable teaching for other applications. Polak's fourth range which is included in FIG. 2 of that patent but not included in FIG. 7 is merely a displacement of the second range without change of torque ratio as indicated by the parallelism of Polak's second and fourth range lines and results from the fact that Polak's fourth range is attained by passing the mechanical input drive through planetary set 92 on a one-to-one ratio to provide a higher mechanical input speed to gear set 55 than that provided by use of the same planetary set to obtain a sun to carrier reduction as was done for second range. This dependent range relationship is also typical of gear train systems used in prior art transmissions represented by the dashed line in FIG. 7 referred to above.

The only use of multiple torque ratios known previously in a hydromechanical steering transmission having integral (internal) steering is the transmission described in U.S. Pat. No. 3,815,698 (Reed) which is represented in FIG. 7 by the line constituting dashes separated by crosshatched dots and so indicated in the key. As already noted, the torque ratio in the second range of that (U.S. Pat. No. 3,815,698) transmission is different from that of its first range because a completely different and distinct combination of gears is used rather than an arrangement to merely offset the speed coverage of the range. The third range of the of the transmission of U.S. Pat. No. 3,815,698 has the same torque ratio as first range but is offset in speed because of the constant overdrive mechanical input to the output ring gear from the third range clutch E. The third range of the present transmission, as depicted by the solid line in FIG. 7 and indicated in the key as "new," has an extended speed range derived from its lower torque ratio made possible by the fact that it can be set independently. The extended third range constitutes a substantial improvement, not only because a greater speed range can be obtained in an independent third range which is not tied to first range torque but because of the flexibility made available to the designer in selection of gear ratios to established torque ratios in all three ranges to permit the proper trade-offs to meet specific vehicle requirements. Comparison of the solid line (this transmission) with the crosshatched line (U.S. Pat. No. 3,815,698) in FIG. 7 demonstrates the point. In each case, the same vehicle power, weight and top speed are parameters to be met but the present invention (solid line—"new") permits a much higher torque ratio in second range because third range can be extended to permit the II–III shift at a lower vehicle speed. With only the second range having independent torque and speed ratios, as was the case with U.S. Pat. No. 3,815,698, a designer is constrained to a second range torque compatible with covering the speed interval between first and third ranges which in turn is set automatically by the first range torque requirements.

The solid line in FIG. 7, as noted, represents a transmission according to the present invention wherein the successively lower slopes of that line in each range illustrate the fact that the desired vehicle speed range can be attained with three ranges with each having successively lower torque ratios and higher speed range coverage in a steering transmission using internal steering without sacrifice of torque in the lower ranges where it is most needed. The advantage of doing this with internal steering is that an internal steer system makes more efficient use of hydrostatic capacities and capabilities and, therefore, can operate on a lower total cubic displacement of hydraulics as compared to the horsepower capacity of the transmission. Another way of stating this is that when the transmission of the present invention is compared with that of Polak's U.S. Pat. No. 3,596,535, it is evident that the total displacement of the two hydraulic units making up the hydrostatic system need equal only the displacement of Polak's "primary single hydrostatic propulsion drive unit 18" rather than the total of that unit 18 plus the capacity of Polak's "single hydrostatic steer drive unit 26."

Accordingly, the contribution to the art of the transmission claimed herein is the attainment of the objective of providing progressively lower torque ratios and higher speed coverages in successively higher ranges in a multi-range hydromechanical steering transmissions of more than two ranges with internal steering while maintaining a constant steering torque ratio in all ranges.

What is claimed as new and desired to be secured by Letters Patent is:

1. A multi-range synchronous shifting hydromechanical transmission comprising:
   an input drive train;
   right and left output multi-element differential gear units each having an output shaft attached to a first said element;
   a hydrostatic component including an input member responsive to said input drive train, right and left output members, hydrostatic means responsive to said input member for propelling said right and left output members hydrostatically at independently controlled variable speeds for propulsion and steering, a third output member and means for propelling said third output member hydrostatically at a speed which is the average of the speed of said right and left output members, whereby the outputs of said right, left and third output members can be used for propulsion and a speed difference between said right and left output members can be used for steering;
   mechanical means for connecting said right and left output members of said hydrostatic component to a second element of said right and left output multi-element differential gear units respectively;
   a mechanical gear train interconnecting said input drive train, said third output member of said hydrostatic component and a third element of said right and left multi-element differential output gear units, said gear train including reduction and differential gearing components and means for selectively actuating said components of said gear train in at least two different combinations of said reduction and differential gearing components for generating and transmitting two different hydromechanical drive speeds to the third elements of said output differential gear units, to cause said transmission to operate in two different hydromechanical ranges, or in a third combination by immobilizing said third elements to lock out said gear train to cause said transmission to operate in a third range, each of said two hydromechanical ranges having a distinct propulsion torque ratio between said right and left output members and said output shafts, said torque ratios both being different from the torque ratio between said right and left output members and said output shafts when said gear train is locked out.

2. The transmission of claim 1 wherein: one of the said two different hydromechanical drive speeds generated by said reduction and differential gearing is a direct function of said average speed of said right and left output members and the other of said two different hydromechanical drive speeds is an inverse function of said average speed.

3. The transmission of claim 2 wherein said reduction and differential gearing for generating two different drive speeds includes a plurality of components which are concentric about a centerline.

4. The transmission of claim 3 wherein said centerline, said hydrostatic component and said output shafts of said output gear units are aligned on a single axis.

5. The transmission of claim 3 wherein said centerline is parallel to but spaced from the axis of said hydrostatic component and said output shafts.

6. A three or more range infinitely variable synchronous shifting split output hydromechanical steering transmission comprising:
a hydrostatic component for producing two independently variable speed outputs for propulsion, the difference in said speed outputs providing a steering differential speed;
a differential device responsive to said two variable speed outputs for producing a speed which is the average of said speeds;
gear means responsive to said average speed and to transmission input for selectively producing two different intermediate range outputs, each being a distinct function of said average speed and of transmission input; and
output gearing responsive to said two independently variable speed outputs and to said two different intermediate range outputs for selectively producing at least three range outputs of which at least two constitute hydromechanical ranges correlated with said two intermediate range outputs and one constitutes another range, said three range outputs each having a separate and distinct propulsive torque ratio while having a common steering torque ratio.

7. A split output infinitely variable synchronous shifting hydromechanical steering transmission having three or more ranges comprising:
input gears;
right and left output combining gears each having an output member;
a hydrostatic component responsive to said input gears for producing right and left independently variable speeds, mechanical means for transmitting said variable speeds to said right and left combining gears respectively for propulsion and steer, and an averaging device responsive to said speeds for producing a speed which is the average of said variable speeds; and
reduction and differential gearing defining at least two selectively operable interconnections among said input gears, averaging device and output combining gears constituting two range mechanisms having different gear ratios and friction means for selectively activating and inactivating said range mechanisms to cause said transmission to operate in different ranges;
whereby steering in all ranges is a result of the speed differences between said right and left independently variable speeds as applied to said combining gears and steering torque ratio is the ratio between the torque at said hydrostatic component and the torque at said output member of said combining gears as transmitted by said means for transmitting; and
whereby at least two of said three or more ranges are hydromechanical ranges using said two range mechanisms each having a distinct torque ratio between said hydrostatic component and the output member of said combining gears which is a different torque ratio than that of steering torque.

8. The transmission of claim 7 wherein said friction means includes means for inactivating and locking out said two selectively operable interconnections to cause said transmission to operate directly through said hydrostatic component, said mechanical means for transmitting and said combining gears to cause one range other than said ranges caused by activation of said two range mechanisms to be a hydrostatic range.

9. In an infinitely variable multi-range synchronous shifting split output hydromechanical steering transmission having a power input element, two power output elements, a hydrostatic propulsion and steer component responsive to said power input element for producing two independently variable hydrostatic speed outputs and gear train means responsive to said hydrostatic component and to said input element for supplying gear train outputs to said two power output elements for propulsion and for steering, the improvement wherein:
said gear train means includes differential, reduction and combining gearing and means for selectively activating said gearing in at least three distinct modes, each mode producing a different gear train output to cause said power output elements to operate in at least three ranges;
said three modes include two modes producing hydromechanical gear train outputs to drive said power output elements in two ranges with propulsive torque ratios between said hydrostatic outputs and said power output elements which are mutually distinct from each other and from the torque ratio of a third range; and
said gear train also transfers any speed difference between said two hydrostatic speed outputs to a corresponding speed difference between said two power output elements which is the same in all ranges to effect steering;
whereby said transmission operates with a constant steering torque ratio in at least three ranges each having distinct propulsion torque ratios.

10. The improvement of claim 7 wherein:
said differential, reduction and combining gearing includes a speed averaging device responsive to said two variable hydrostatic speed outputs to produce a third hydrostatic output which is the speed average of said two hydrostatic outputs; and
said gearing uses said third hydrostatic output to combine with input from said power input element in said two modes to produce said hydromechanical gear train outputs to create said two ranges having mutually distinct propulsion torque ratios.

11. The improvement of claim 10 wherein:
said gearing includes a plurality of differential, reduction and combining gear units in addition to said speed averaging device which is one of said gear units; and said means for selectively activating and inactivating a distinct combination of said gear units for each said mode in which said gearing operates.

12. The improvement of claim 11 wherein:
said means for selectively activating includes a friction device for creating such range;
said gear units of said gear train include a pair of three element final combining gears, each of said two power output elements being a first element of one of said final combining gears, a second element of each of said final combining gears being driven by one of said two hydrostatic speed outputs produced by said hydrostatic component; and
said gear train means in each of said two modes uses a different combination of gear units as controlled by the appropriate friction device to interconnect said power input element, said speed averaging device and the third element of each said final combining gear units.

13. The improvement of claim 12 wherein:
said gear train is activated in said mode other than said two modes by one said friction device immobilizing said third element of each of said final combining gear units to cause said final combining gear units to be driven only by said two independently variable hydrostatic speed outputs;
whereby said mode constitutes a hydrostatic range and said transmission operates in one hydrostatic and two hydromechanical ranges.

14. The improvement of claim 13 wherein:
the torque ratio of said hydrostatic range is higher than the torque ratio of the hydromechanical ranges and constitutes a first range;
the hydromechanical range having the higher torque ratio is the second range; and
the hydromechanical range having the lower torque ratio is the third range.

15. The improvement of claim 14 wherein:
said torque ratio of said hydrostatic range is the same as said constant steering torque ratio.

* * * * *

UNITED STATES PATENT OFFICE
CERTIFICATE OF CORRECTION

PATENT NO. : 4,345,488
DATED : August 24, 1982
INVENTOR(S) : Bradley O. Reed

It is certified that error appears in the above-identified patent and that said Letters Patent are hereby corrected as shown below:

Column 18, line 53, "7" should read --9--.

Signed and Sealed this

Sixteenth Day of November 1982

[SEAL]

Attest:

Attesting Officer

GERALD J. MOSSINGHOFF

Commissioner of Patents and Trademarks